United States Patent
Hano

(10) Patent No.: US 10,848,089 B2
(45) Date of Patent: Nov. 24, 2020

(54) MOTOR DRIVE DEVICE AND CONTROL METHOD FOR MOTOR DRIVE DEVICE

(71) Applicant: HITACHI AUTOMOTIVE SYSTEMS, LTD., Hitachinaka (JP)

(72) Inventor: Masaki Hano, Isesaki (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/490,951

(22) PCT Filed: Sep. 19, 2018

(86) PCT No.: PCT/JP2018/034678
§ 371 (c)(1),
(2) Date: Sep. 4, 2019

(87) PCT Pub. No.: WO2019/073765
PCT Pub. Date: Apr. 18, 2019

(65) Prior Publication Data
US 2020/0021217 A1 Jan. 16, 2020

(30) Foreign Application Priority Data

Oct. 11, 2017 (JP) .................................. 2017-197896

(51) Int. Cl.
*H02P 21/05* (2006.01)
*H02P 21/22* (2016.01)
*H02P 27/12* (2006.01)

(52) U.S. Cl.
CPC .............. *H02P 21/05* (2013.01); *H02P 21/22* (2016.02); *H02P 27/12* (2013.01)

(58) Field of Classification Search
CPC .......... H02P 21/22; H02P 21/14; H02P 21/18; H02P 21/141
See application file for complete search history.

(56) References Cited

U.S. PATENT DOCUMENTS

2006/0043917 A1 3/2006 Kifuku
2009/0079373 A1 3/2009 Nagase et al.
(Continued)

FOREIGN PATENT DOCUMENTS

CN 1741368 A 3/2006
CN 104753422 A 7/2015
(Continued)

OTHER PUBLICATIONS

Office Action issued in corresponding Chinese Patent Application No. 201880023485.2 dated Jan. 16, 2020 with English translation.

*Primary Examiner* — Zoheb S Imtiaz
(74) *Attorney, Agent, or Firm* — Foley & Lardner LLP

(57) ABSTRACT

An abnormality diagnostic unit of a motor drive device has an inverter that supplies AC power to an electric motor, and a current measuring means for measuring a DC bus current of the inverter, calculates an estimated upper q-axis current limit and an estimated lower q-axis current limit based on a diagnostic q-axis voltage command value obtained by subjecting a q-axis voltage command value to an absolute value process. The abnormality diagnostic unit calculates a diagnostic q-axis current measurement based on: a q-axis current measurement calculated based on an output of the current measuring means; and sign information of the q-axis voltage command value. Then, the abnormality diagnostic unit determines whether the current measuring means is abnormal based on duration of deviation of the diagnostic q-axis current measurement from a normal range defined by the estimated upper q-axis current limit and the estimated lower q-axis current limit.

6 Claims, 11 Drawing Sheets

(56) References Cited

U.S. PATENT DOCUMENTS

| | | |
|---|---|---|
| 2009/0323232 A1 | 12/2009 | Suzuki et al. |
| 2014/0077741 A1 | 3/2014 | Kumagai et al. |
| 2014/0088831 A1 | 3/2014 | Hisazumi et al. |
| 2014/0184114 A1* | 7/2014 | Omata ................. H02N 2/0075 318/400.02 |
| 2015/0145448 A1 | 5/2015 | Mukai et al. |
| 2016/0229309 A1* | 8/2016 | Mitsutani .............. B60L 3/0084 |
| 2019/0252970 A1* | 8/2019 | Ohdaira ............ H02M 7/53871 |

FOREIGN PATENT DOCUMENTS

| | | |
|---|---|---|
| JP | H09-172703 A | 6/1997 |
| JP | 2002-276446 A | 9/2002 |
| JP | 2009-081930 A | 4/2009 |
| JP | 2010-011636 A | 1/2010 |
| JP | 2013-110864 A | 6/2013 |
| JP | 2014-064430 A | 4/2014 |
| JP | 2015-104239 A | 6/2015 |

* cited by examiner

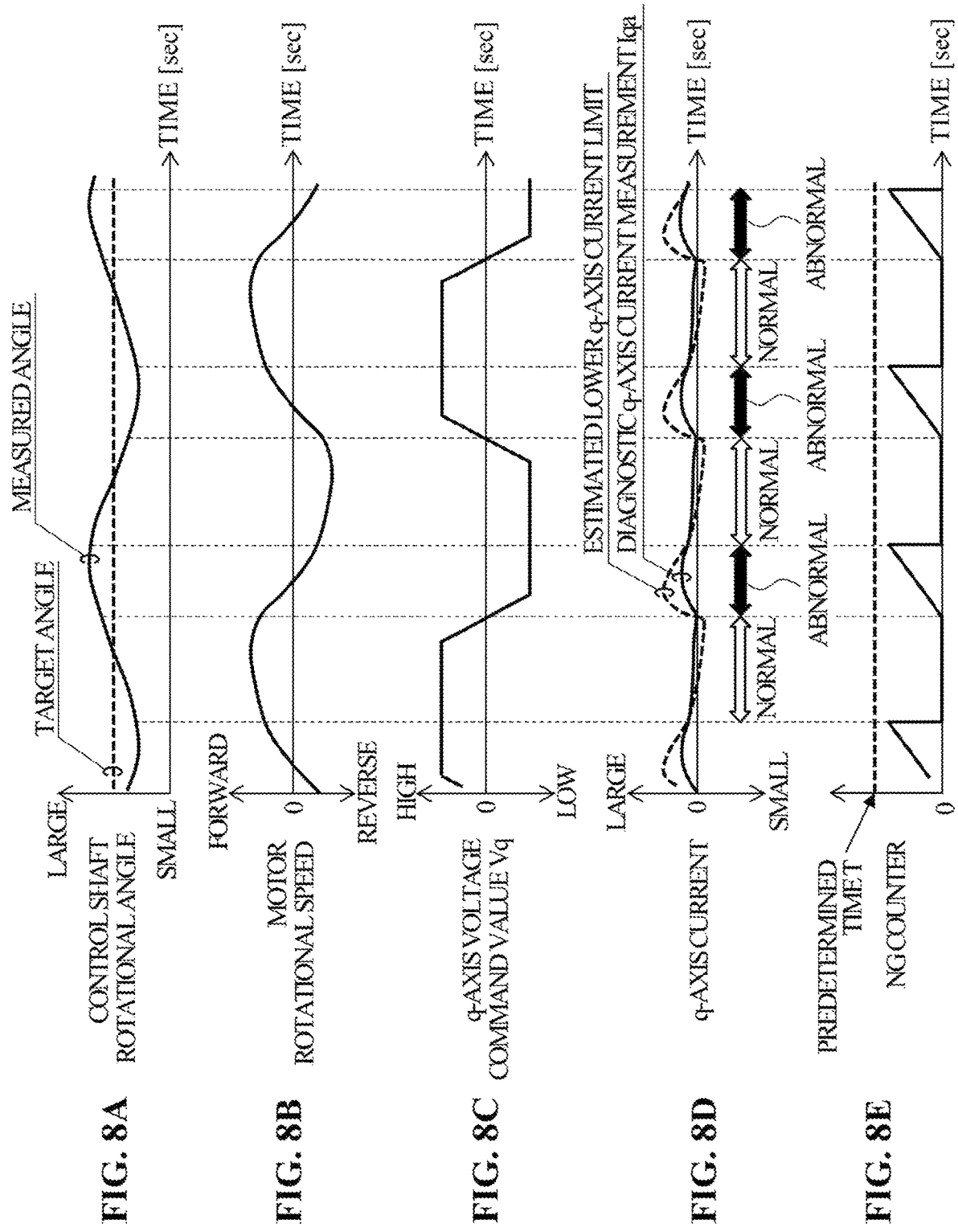

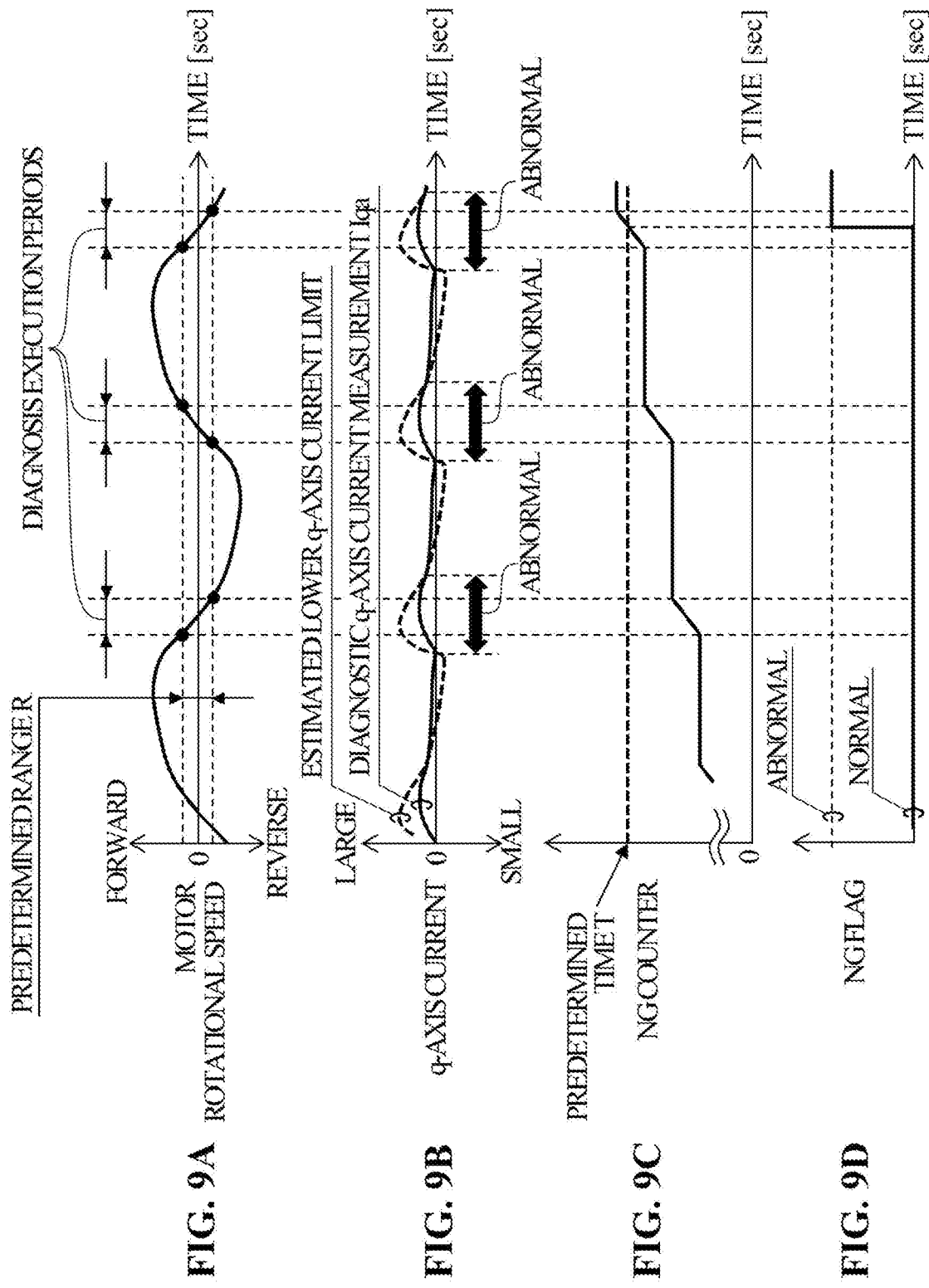

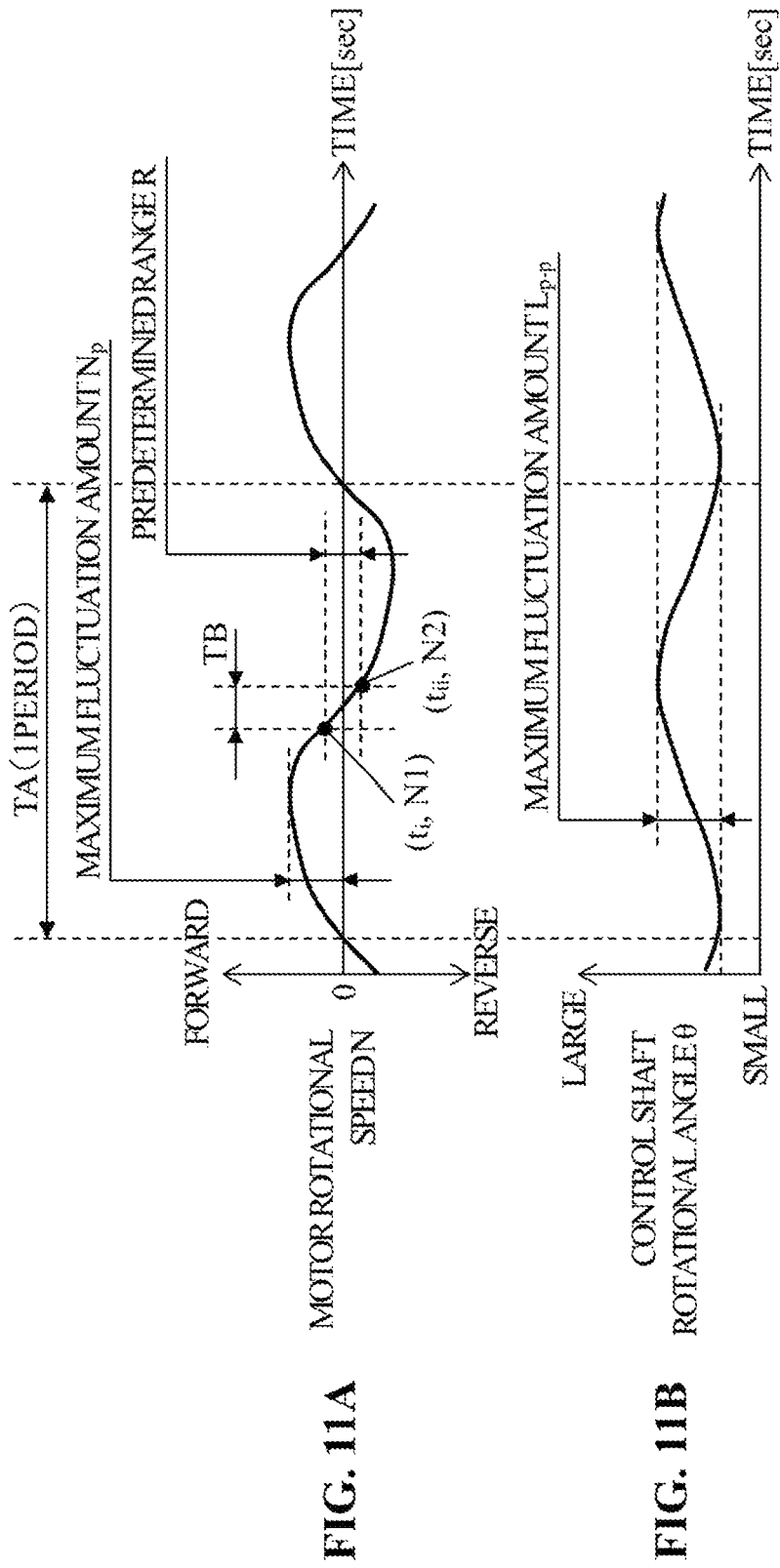

MOTOR DRIVE DEVICE AND CONTROL METHOD FOR MOTOR DRIVE DEVICE

TECHNICAL FIELD

The present invention relates to motor drive devices and control methods for motor drive devices, and more specifically, relates to abnormality determination of current measuring means for measuring each phase current with one shunt resistor.

BACKGROUND ART

As conventional motor drive devices and control methods thereof, there are known devices and methods in which it is determined whether a motor current measuring circuit for control that receives both end voltages of one shunt resistor is abnormal based on motor current for control measured by the motor current measuring circuit for control and motor current for diagnosis measured by a motor current measuring circuit for diagnosis that receives inverted both end voltages, as disclosed in Patent Document 1, for example.

REFERENCE DOCUMENT LIST

Patent Document

Patent Document 1: JP 2013-110864 A

SUMMARY OF THE INVENTION

Problem to be Solved by the Invention

However, in Patent Document 1, since an additional current measuring circuit is provided in addition to the motor current measuring circuit for control, as described above, there is a concern that the number of components in the motor drive device will increase and the size of the motor drive device will increase.

Thus, in view of these problems, an object of the present invention is to provide a motor drive device and a control method for the motor drive device, enabling abnormality determination of a current measuring means for measuring each phase current with one shunt resistor with a simple configuration.

Means for Solving the Problem

Thus, the motor drive device according to the present invention comprises: an inverter that supplies an alternating-current power to an electric motor; a current sensor that measures a direct-current bus current of the inverter; and a controller that controls the inverter based on an output of the current sensor, wherein the controller compares a q-axis current measurement calculated based on the output of the current sensor and an estimated q-axis current value estimated based on a q-axis voltage command value, and determines whether the current sensor is abnormal based on a duration of deviation that is a duration of continuous deviation of the q-axis current measurement from the estimated q-axis current value.

The control method of a motor drive device according to the present invention controls the motor drive device including: an inverter that supplies an alternating-current power to an electric motor; and a current sensor that measures a direct-current bus current of the inverter. The method comprises steps of: comparing a q-axis current measurement calculated based on an output of the current sensor and an estimated q-axis current value estimated based on a q-axis voltage command value; and determining whether the current sensor is abnormal based on a duration of deviation that is a duration of continuous deviation of the q-axis current measurement from the estimated q-axis current value.

Effects of the Invention

According to the motor drive device and the control method for the motor drive device of the present invention, it is possible to perform abnormality determination of the current measuring unit that measures each phase current with one shunt resistor with a simple configuration.

BRIEF DESCRIPTION OF THE DRAWINGS

FIGS. 8A to 8E are timing diagrams for explaining erroneous diagnosis due to a current measurement gain decreasing abnormality.

FIGS. 9A to 9D are timing diagrams for explaining diagnosis execution periods in the abnormality diagnostic processing.

FIGS. 11A and 11B are explanatory diagrams for describing an example of a method for setting a predetermined time length.

MODE FOR CARRYING OUT THE INVENTION

Figure 1:
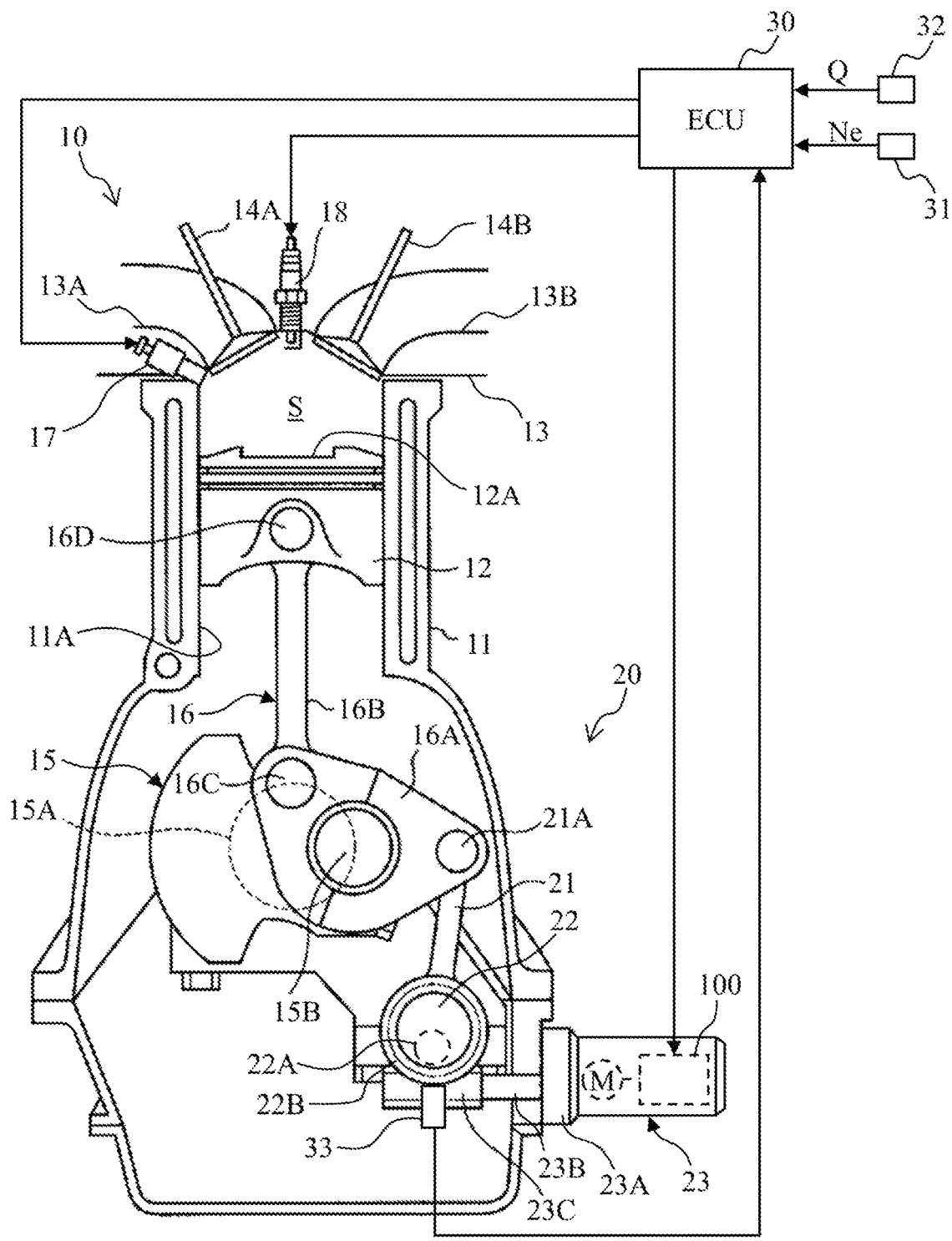
FIG. 1 is a configuration view illustrating an example of an internal combustion engine for a vehicle, to which a motor drive device is applied.

Hereinbelow, embodiments of the present invention will be described in detail with reference to the accompanying drawings. FIG. 1 illustrates an example of an internal combustion engine for a vehicle, to which a motor drive device is applied.

An internal combustion engine 10 includes a cylinder block 11, a piston 12 inserted in a cylinder bore 11A of cylinder block 11 in a manner capable of reciprocating movement, and a cylinder head 13 having an intake port 13A and an exhaust port 13B. Internal combustion engine 10 includes an intake valve 14A that opens and closes an open end of intake port 13A, and an exhaust valve 14B that opens and closes an open end of exhaust port 13B.

Piston 12 is connected to a crankshaft 15 via a connecting rod 16 including a lower link 16A and an upper link 16B. A combustion chamber S is formed between a crown surface 12A of piston 12 and a lower surface of cylinder head 13. To cylinder head 13, there are mounted a fuel injection valve 17 for injecting fuel, and an ignition plug 18 for igniting a mixture of fuel and air, facing combustion chamber S.

Crankshaft 15 includes multiple journal portions 15A and multiple crank pin portions 15B. Journal portions 15A are rotatably supported by main bearings (not shown) of cylinder block 11. Crank pin portions 15B are eccentric to journal portions 15A, and lower link 16A is rotatably coupled to each of crank pin portions 15B. Upper link 16B has a lower end rotatably coupled to one end of lower link 16A by a coupling pin 16C and has an upper end rotatably coupled to piston 12 by a piston pin 16D.

Internal combustion engine 10 includes a variable compression ratio (VCR) mechanism 20 that makes the compression ratio variable by changing the volume of combustion chamber S. VCR mechanism 20 makes the compression ratio of internal combustion engine 10 variable by changing the volume of combustion chamber S using, for example, a multi-link mechanism as disclosed in JP 2002-276446 A.

VCR mechanism 20 includes a control link 21, a control shaft 22, and a compression ratio control actuator 23. Control link 21 has an upper end rotatably coupled to the other end of lower link 16A by a coupling pin 21A, and a lower end rotatably coupled to a lower portion of cylinder block 11 via control shaft 22. Specifically, control shaft 22 is rotatably supported by cylinder block 11, and has an eccentric cam portion 22A that is eccentric to the rotation center of control shaft 22. A lower end portion of control link 21 is rotatably fitted to eccentric cam portion 22A. On the other hand, a rotary output of an electric motor M, which is a power source of compression ratio control actuator 23, is decelerated by a reducer 23A, and then is transmitted to an output shaft 23B. The rotary output transmitted to output shaft 23B is further transmitted to control shaft 22 by engagement between a gear (e.g., worm gear) 23C formed on output shaft 23B and a gear (e.g., worm wheel) 22B formed on control shaft 22. That is, electric motor M, serving as compression ratio control actuator 23, drives control shaft 22, and thus drives VCR mechanism 20.

In such a VCR mechanism 20, the rotational angle of control shaft 22 is controlled by making electric motor M, serving as compression ratio control actuator 23, rotate forward or in reverse. When compression ratio control actuator 23 rotates control shaft 22, the center position of eccentric cam portion 22A that is eccentric to the rotation center of control shaft 22 changes. This changes the pivotal support position of the lower end of control link 21, so that the position of piston 12 at the piston top dead center (TDC) becomes higher or lower, and thus, the volume of combustion chamber S increases or decreases to change the compression ratio of internal combustion engine 10.

Compression ratio control actuator 23 includes, in addition to electric motor M, a built-in motor drive device 100 for driving electric motor M. Motor drive device 100 is connected to an engine control unit (ECU) 30 that electronically controls fuel injection valve 17 and ignition plug 18 of internal combustion engine 10, via an in-vehicle network, such as a controller area network (CAN).

ECU 30 includes a built-in microcomputer, and is connected to various sensors to sense the operation state of internal combustion engine 10, so as to receive output signals from the various sensors. The various sensors include a rotational speed sensor 31 that measures rotational speed Ne of internal combustion engine 10, and a load sensor 32 that measures load Q of internal combustion engine 10. The various sensor also includes a rotational angle sensor 33 that measures the rotational angle of control shaft 22 as a parameter corresponding to the actual compression ratio of internal combustion engine 10. Here, as load Q of internal combustion engine 10, a state quantity closely related to torque, such as intake negative pressure, intake flow rate, supercharging pressure, accelerator opening degree, or throttle opening degree, can be used. ECU 30 calculates a target compression ratio corresponding to rotational speed Ne and load Q of internal combustion engine 10. The target compression ratio may be obtained, for example, by referring to a map in which a compression ratio adapted to rotational speed and load in internal combustion engine 10 is set. After calculating the target angle of control shaft 22 corresponding to the target compression ratio, ECU 30 calculates a target torque of electric motor M so that the measured angle of control shaft 22 measured by rotational angle sensor 33 approaches the target angle. Then, ECU 30 outputs a command signal including the target torque to motor drive device 100.

Figure 2:
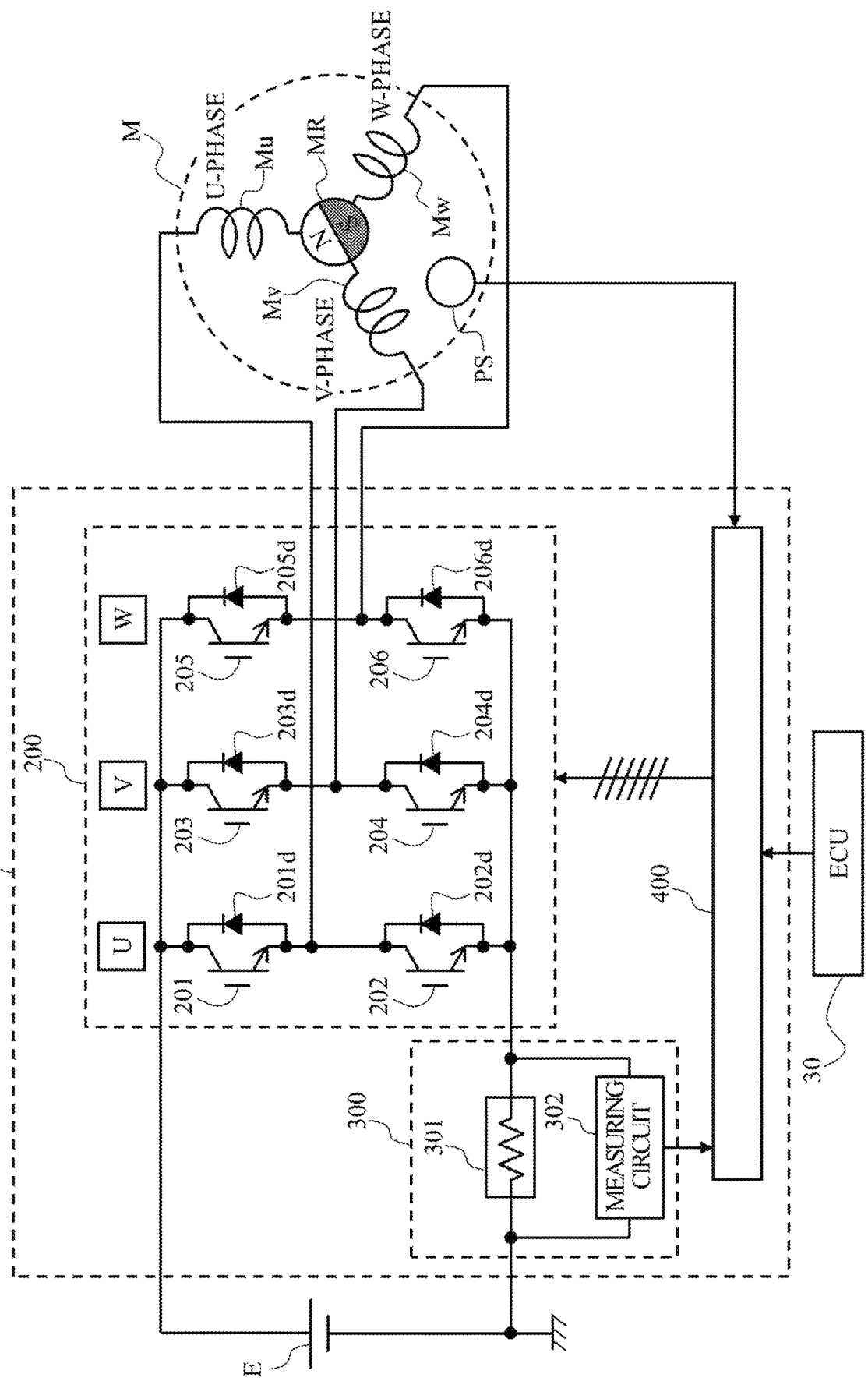
FIG. 2 is a circuit diagram illustrating an example of the internal configuration of the motor drive device and that of an electric motor.

FIG. 2 illustrates the internal configuration of the electric motor and motor drive device. Electric motor M is a three-phase brushless motor, and includes a rotor (permanent magnet rotor) MR rotatably disposed at the axial center of a space formed at the center of a cylindrical stator (not shown). Three-phase coils of a U-phase coil Mu, a V-phase coil Mv, and a W-phase coil Mw are wound around the stator, and are star-connected. Motor drive device 100 includes an inverter 200, a current measuring unit 300, and a controller 400.

Inverter 200 is connected to a direct-current, in-vehicle power supply E, and has an electric circuit in which six switching elements 201 to 206 are three-phase bridge-connected to supply an alternating-current power to electric motor M. Switching elements 201 to 206 include antiparallel diodes 201d to 206d, respectively. Switching elements 201 to 206 are composed of semiconductor elements for use in power control, such as field effect transistors (FETs) or insulated gate bipolar transistors (IGBTs). Control terminals (gate terminals) of switching elements 201 to 206 are connected to an output port of controller 400.

Current measuring unit 300 is a current sensor that measures a direct-current (DC) bus current of inverter 200, and includes one shunt resistor 301 and a measuring circuit 302. For example, shunt resistor 301 is connected in series between a lower arm of each phase and the ground side of in-vehicle power supply E. Measuring circuit 302 including an operational amplifier, for example, is connected to both ends of shunt resistor 301. Measuring circuit 302 measures a potential difference between both ends of shunt resistor 301, which changes in accordance with the amount of current flowing through shunt resistor 301, and measuring circuit 302 outputs a voltage corresponding to the potential difference to controller 400, as an analog current measurement voltage.

Controller 400 is provided with a microcomputer including: a microprocessor, such as a central processing unit (CPU) and a micro processing unit (MPU); and a memory device, such as a read only memory (ROM) and a random access memory (RAM). Controller 400 is connected to a magnetic pole position sensor PS that measures the magnetic pole position of rotor MR in electric motor M, such as a Hall element, a Hall integrated circuit (IC), and a resolver. Controller 400 receives a magnetic pole position measurement signal that is output from magnetic pole position sensor PS. The microcomputer of controller 400 is configured to output a control signal to a control terminal of each switching element 201 to 206 based on the current measurement voltage, the magnetic pole position measurement signal, and the command signal (target torque) from ECU 30. The control signal controls switching between ON and OFF states of switching elements 201 to 206.

Specifically, controller 400 controls the switching between the ON and OFF states of switching elements 201 to 206 by triangular-wave comparison pulse width modulation (PWM), to control a voltage applied to electric motor M. In the PWM control based on the triangular wave comparison, a triangular wave carrier and a voltage command value (duty command value) are compared to determine a timing for switching the ON and OFF states of switching elements 201 to 206. That is, the comparison between the triangular wave carrier and the voltage command value determines rising and falling timings of a PWM pulse, serving as a control signal of switching elements 201 to 206.

Controller 400 performs PWM control on switching elements 201 to 206 in inverter 200 by a complementary method. That is, the PWM pulses for controlling the switching of the ON and OFF states of lower arm switching elements 202, 204, 206 have a reversed phase with respect to the corresponding PWM pulses for controlling the switching of the ON and OFF states of upper arm switching elements 201, 203, 205. More specifically, when the PWM pulse for upper arm switching element 201, 203, 205 is high at logic level, the corresponding PWM pulse for lower arm switching element 202, 204, 206 of the same phase is low at logic level. When the upper arms of all phases are turned on, the lower arms of all phases are turned off, whereas when the lower arms of all phases are turned on, the upper arms of all phases are turned off.

Figure 3:
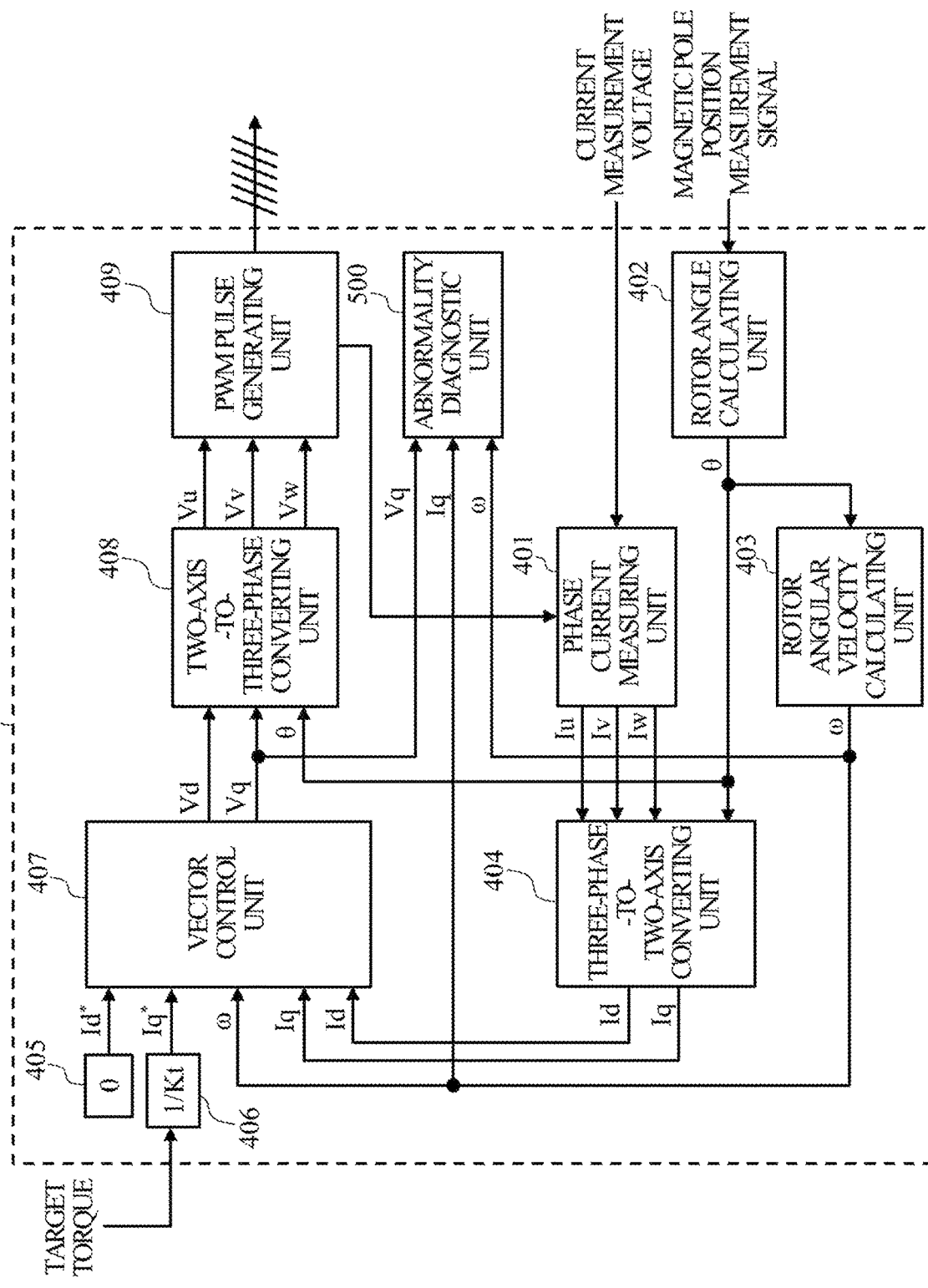
FIG. 3 is a functional block diagram illustrating an example of command voltage setting processing in a controller.

FIG. 3 is a functional block diagram of the controller, and illustrates processing for setting three-phase command voltages by a vector control method. Controller 400 includes a phase current measuring unit 401, a rotor angle calculating unit 402, a rotor angular velocity calculating unit 403, a three-phase-to-two-axis converting unit 404, a d-axis current command value setting unit 405, a q-axis current command value setting unit 406, a vector control unit 407, a two-axis-to-three-phase converting unit 408, and a PWM pulse generating unit 409.

Phase current measuring unit 401 calculates the DC bus current of inverter 200 from an analog-to-digital (A/D) conversion value obtained by converting the current measurement voltage output from measuring circuit 302 of current measuring unit 300 by an A/D converter (not shown). Then, phase current measuring unit 401 measures a phase current of each phase, as phase current measurements Iu, Iv, Iw, based on the calculated DC bus current. That is, controller 400 is configured to measure the phase current of each phase of electric motor M by one shunt resistor 301. The details of the phase current measuring method will be described later.

Rotor angle calculating unit 402 calculates magnetic pole position θ of rotor MR in electric motor M based on the magnetic pole position measurement signal output from magnetic pole position sensor PS. Rotor angular velocity calculating unit 403 calculates angular velocity ω of rotor MR from a temporal change of magnetic pole position θ of rotor MR calculated by rotor angle calculating unit 402.

Three-phase-to-two-axis converting unit 404 converts phase current measurements Iu, Iv, Iw measured by phase current measuring unit 401 into a d-axis current measurement Id and a q-axis current measurement Iq in a two-axis rotational coordinate system (d-q coordinate system), based on magnetic pole position θ of rotor MR at that time.

The d-axis current command value setting unit 405 sets command value Id* of the d-axis current in the d-q coordinate system (d-axis current command value) to, for example, zero. The q-axis current command value setting unit 406 sets command value Iq* of the q-axis current in the d-q coordinate system (q-axis current command value) by, for example, dividing the target torque from ECU 30 by torque constant Kt specific to electric motor M.

Vector control unit 407 calculates d-axis voltage command value Vd and q-axis voltage command value Vq in the d-q coordinate system, based on d-axis current command value Id* and q-axis current command value Iq*, angular velocity ω of rotor MR, and d-axis current measurement Id and q-axis current measurement Iq. That is, vector control unit 407 calculates d-axis voltage command value Vd and q-axis voltage command value Vq so that d-axis current measurement Id approaches d-axis current command value Id*, and q-axis current measurement Iq approaches q-axis current command value Iq*, by current feedback control, such as PI control, considering angular velocity ω.

Two-axis-to-three-phase converting unit 408 converts d-axis voltage command value Vd and q-axis voltage command value Vq calculated by vector control unit 407 into a three-phase voltage command values of U-phase voltage command value Vu, V-phase voltage command value Vv, and W-phase voltage command value Vw, based on magnetic pole position θ of rotor MR at that time.

Furthermore, two-axis-to-three-phase converting unit 408 corrects three-phase voltage command values Vu, Vv, Vw to perform pulse shift processing for shifting forward or backward a PWM pulse, which is generated to have the center at a time corresponding to a trough of the triangular wave carrier. This pulse shift processing is necessary for generating a measuring timing of the phase current, and the details thereof will be described later.

PWM pulse generating unit 409 determines the rising timing and falling timing of the PWM pulse for driving switching elements 201 to 206 based on comparison of the three-phase voltage command values Vu, Vv, Vw and the triangular wave carrier. Then, PWM pulse generating unit 409 outputs the PWM pulse generated by determining the rising and falling timings to each control terminal of switching elements 201 to 206 of inverter 200.

For example, regarding switching element 201 of the U-phase upper arm, PWM pulse generating unit 409 generates a PWM pulse by comparing U-phase voltage command value Vu and the triangular wave carrier. When U-phase voltage command value Vu is greater than the triangular wave carrier, PWM pulse generating unit 409 sets the PWM pulse for driving switching element 201 of the U-phase upper arm to a high level at logic level. On the other hand, when U-phase voltage command value Vu is less than the triangular wave carrier, PWM pulse generating unit 409 sets the PWM pulse for driving switching element 201 of the U-phase upper arm to a low level at logic level. PWM pulse generating unit 409 also generates an inverted signal of the PWM pulse for driving switching element 201 of the U-phase upper arm, as a PWM pulse for driving switching element 202 of the U-phase lower arm.

Similarly, PWM pulse generating unit 409 generates PWM pulses for driving switching elements 203 and 204 of the V-phase upper and lower arms, and generates PWM pulses for driving switching elements 205 and 206 of the W-phase upper and lower arms.

Herein, it is described that the units of controller 400 are implemented by the microcomputer that reads and executes the pre-stored program in a storage means, such as a read only memory (ROM). However, some of or all of the units of controller 400 may be implemented by a hardware configuration.

Next, a method for measuring the phase current performed in phase current measuring unit 401 will be described.

First, the DC bus current of inverter 200 calculated based on the current measurement voltage may correspond to the phase current of one phase depending on the combination of the PWM pulses output to switching elements 201 to 206. By using this feature, phase current measuring unit 401 measures the phase current of each phase of electric motor M, as phase current measurements Iu, Iv, Iw.

For example, a case considered herein is that switching element 201 of the U-phase upper arm is in the ON state and switching element 203 of the V-phase upper arm and switching element 205 of the W-phase upper arm are both in the OFF state. In this case, since the current having flowed through U-phase coil Mu is divided between V-phase coil Mv and W-phase coil Mw, phase current measuring unit 401 uses the calculated DC bus current as phase current measurement Iu of the U-phase. That is, when one of upper arm switching elements 201, 203 and 205 of the three phases is in the ON state and the others are in the OFF state, phase current measuring unit 401 measures the phase current of the phase in which the upper arm switching element is in the ON state.

Next, a case considered herein is that switching element 201 of the U-phase upper arm and switching element 203 of the V-phase upper arm are both in the ON state, and switching element 205 of the W-phase upper arm is in the OFF state. In this case, since the current having flowed through U-phase coil Mu and the current having flowed through V-phase coil Mv merge and flow into W-phase coil Mw, phase current measuring unit 401 uses the calculated DC bus current as phase current measurement Iw of the W-phase. That is, when two of the upper arm switching elements 201, 203 and 205 of the three phases are in the ON state, and the other is in the OFF state, phase current measuring unit 401 measures the phase current of the phase in which the upper arm switching element is in the OFF state.

Thus, phase current measuring unit 401 sets a time period in which the logic levels of the PWM pulses indicate that one or two of the upper arm switching elements 201, 203, 205 of the three phases are in the ON state, to be a phase current measurement period. In each phase current measurement period, phase current measuring unit 401 identifies, as a phase the phase current of which is to be measured, a phase of the only one upper arm switching element which is in the ON state, or a phase of the only one upper arm switching element which is in the OFF state. A phase current measuring timing for actually measuring the phase current is set within the phase current measurement period, considering, for example, a sampling timing in the A/D conversion of the current measurement voltage. Then, phase current measuring unit 401 samples the current measurement voltage at the phase current measuring timing, and calculates the current value of the DC bus current obtained from the sampled value, as the phase current measurement of the phase identified as the measurement target at that time.

Here, when two of the three phase currents in electric motor M are measured, the remaining one phase current can be obtained by calculation using that the sum of the three phase currents becomes zero. Therefore, two-axis-to-three-phase converting unit 408 performs pulse shift processing that makes the PWM pulses shifted each other so that the phase current measuring timing for measuring two phase currents among the three phases in electric motor M can be set.

Figure 4:
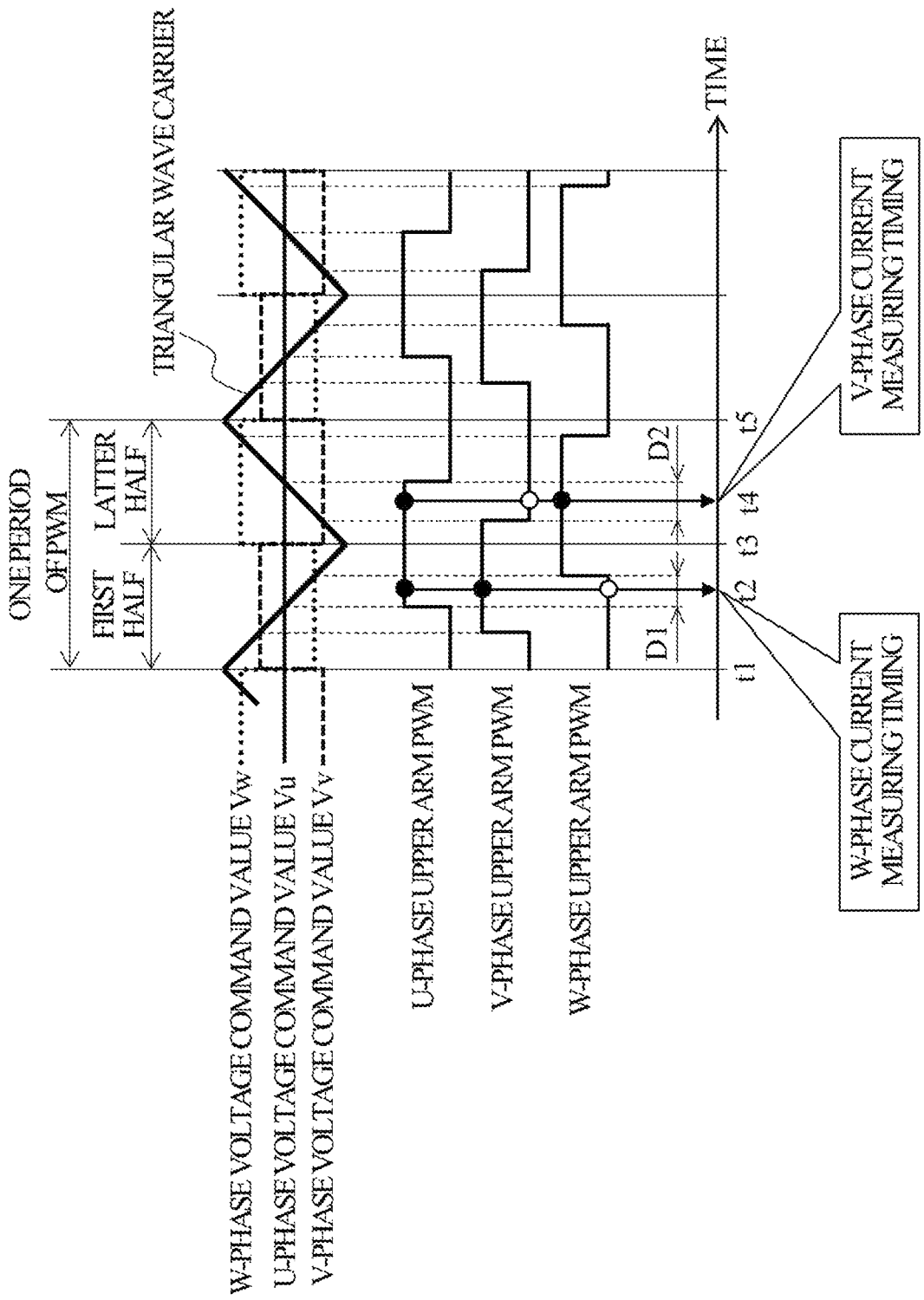
FIG. 4 is a timing diagram illustrating an aspect of phase current measurement in the controller.

FIG. 4 is a timing diagram illustrating an aspect of phase current measurement by the pulse shift processing. As illustrated in FIG. 4, a case considered herein is that, for example, phase current measurement Iv of the V-phase and phase current measurement Iw of W-phase are measured. Two-axis-to-three-phase converting unit 408 corrects V-phase voltage command value Vv and W-phase voltage command value Vw so that the PWM pulse for switching element 203 of the V-phase upper arm is made to be shifted forward, and the PWM pulse for switching element 205 of the W-phase upper arm is made to be shifted backward. Specifically, when shifting forward the PWM pulse for switching element 203 of the V-phase upper arm, two-axis-to-three-phase converting unit 408 performs increasing correction of V-phase voltage command value Vv in the first half period (time t1 to time t3) before the trough of the triangular wave carrier. Furthermore, two-axis-to-three-phase converting unit 408 performs decreasing correction of V-phase voltage command value Vv in the latter half period (time t3 to time t5) after the trough of the triangular wave carrier, in accordance with the amount of increasing correction of V-phase voltage command value Vv. When shifting backward the PWM pulse for switching element 205 of the W-phase upper arm, two-axis-to-three-phase converting unit 408 performs decreasing correction of W-phase voltage command value Vw in the first half period (time t1 to time t3) before the trough of the triangular wave carrier. Furthermore, two-axis-to-three-phase converting unit 408 performs increasing correction of W-phase voltage command value Vw in the latter half period (time t3 to time t5) after the trough of the triangular wave carrier, in accordance with the amount of decreasing correction of W-phase voltage command value Vw.

Since U-phase voltage command value Vu is not corrected by two-axis-to-three-phase converting unit 408, the PWM pulse for switching element 201 of the U-phase upper arm is generated so that the center thereof is located at a time corresponding to the trough (time t3) of the triangular wave carrier. On the other hand, V-phase voltage command value Vv and W-phase voltage command value Vw are corrected by two-axis-to-three-phase converting unit 408. Thus, the PWM pulse for switching element 203 of the V-phase upper arm is made to be shifted forward, and this PWM pulse is generated so that the center thereof is located at a time that is before the trough (time t3) of the triangular wave carrier. Furthermore, the PWM pulse for switching element 205 of the W-phase upper arm is made to be shifted backward, and this PWM pulse is generated so that the center thereof is located at a time that is after the trough (time t3) of the triangular wave carrier.

By this pulse shift processing, phase current measurement period D1 is generated in the first half period (time t1 to time t3) before the trough of the triangular wave carrier. In phase current measurement period D1, switching element 201 of the U-phase upper arm and switching element 203 of the V-phase upper arm are in the ON state, and switching element 205 of the W-phase upper arm is in the OFF state. Furthermore, phase current measurement period D2 is generated in the latter half period (time t3 to time t5) after the trough of the triangular wave carrier. In phase current measurement period D2, switching element 201 of the U-phase upper arm and switching element 205 of the W-phase upper arm are in the ON state, and switching element 203 of the V-phase upper arm is in the OFF state.

Thus, time t2 in phase current measurement period D1 in the first half period (time t1 to time t3) before the trough of the triangular wave carrier is set to be the phase current measuring timing for measuring the phase current of the W-phase. Phase current measuring unit 401 samples the current measurement voltage output from measuring circuit 302 of current measuring unit 300 at time t2 as the phase current measuring timing, to measure the phase current of the W-phase. Furthermore, time t4 in phase current measurement period D2 in the latter half period (time t3 to time t5) after the trough of the triangular wave carrier is set to be the phase current measuring timing for measuring the phase current of the V-phase. Phase current measuring unit 401 samples the current measurement voltage output from measuring circuit 302 of current measuring unit 300 at time t4 as the phase current measuring timing, to measure the phase current of the V-phase. Then, phase current measuring unit 401 calculates phase current measurement Iu of the U-phase from phase current measurement Iv of the V-phase and phase current measurement Iw of the W-phase, from an arithmetic expression of Iu=−(Iv+Iw).

Referring again to FIG. 3, controller 400 further includes an abnormality diagnostic unit 500 that determines whether an abnormality occurs in current measuring unit 300 including shunt resistor 301 based on q-axis voltage command value Vq, q-axis current measurement Iq, and angular velocity ω of rotor MR.

Figure 5:
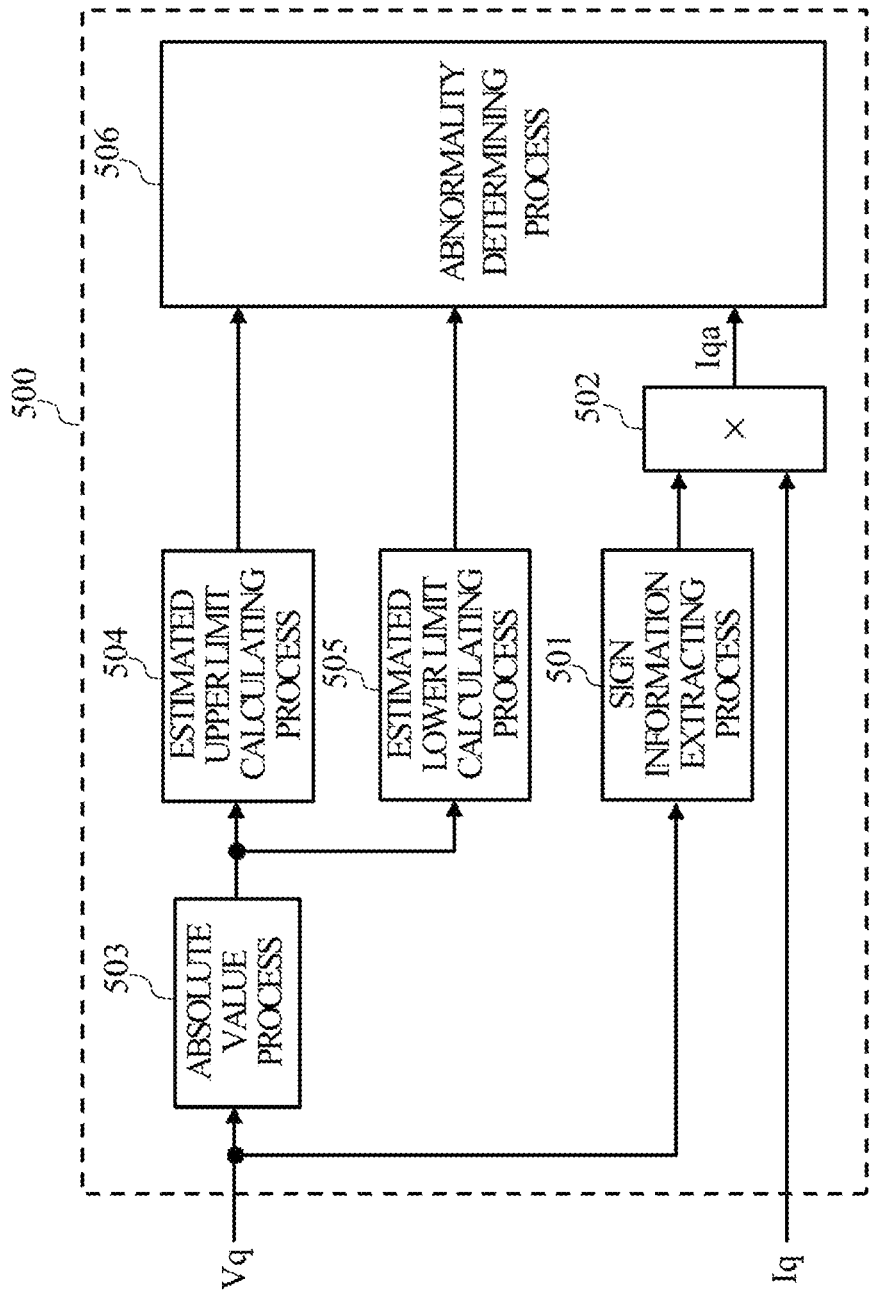
FIG. 5 is a functional block diagram illustrating the outline of abnormality diagnostic processing in an abnormality diagnostic unit.

FIG. 5 illustrates the outline of abnormality diagnostic processing in the abnormality diagnostic unit of the controller. Abnormality diagnostic unit 500 performs sign information extracting process 501 for extracting sign information of q-axis voltage command value Vq calculated by vector control unit 407. Then, in a multiplying process 502, when the sign of q-axis voltage command value Vq indicates negative, abnormality diagnostic unit 500 multiplies (−1) and q-axis current measurement Iq obtained by three-phase-to-two-axis converting unit 404, to obtain diagnostic q-axis current measurement Iqa, which is a converted value of q-axis current measurement Iq for use in the diagnosis. When the sign of q-axis voltage command value Vq indicates positive, abnormality diagnostic unit 500 multiplies (+1) and q-axis current measurement Iq obtained by three-phase-to-two-axis converting unit 404, to obtain diagnostic q-axis current measurement Iqa. In short, in multiplying process 502, abnormality diagnostic unit 500 determines whether diagnostic q-axis current measurement Iqa is a positive number or a negative number based on whether q-axis voltage command value Vq is a positive number or a negative number.

Figure 6:
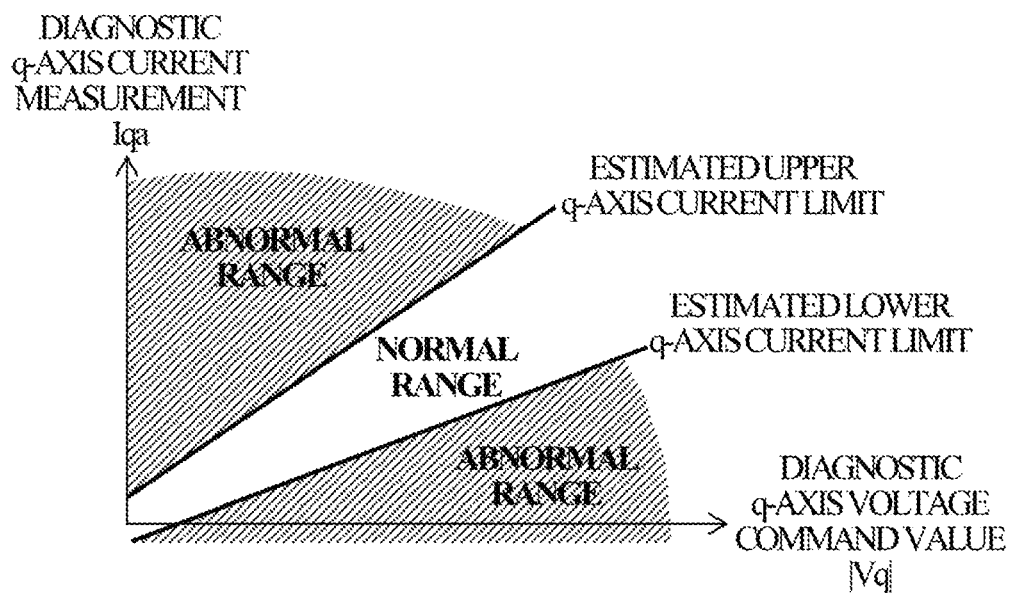
FIG. 6 is a schematic view illustrating a normal range and abnormal ranges of q-axis current.

Furthermore, abnormality diagnostic unit 500 performs an absolute value process 503 for converting q-axis voltage command value Vq calculated by vector control unit 407 into an absolute value. After absolute value process 503, abnormality diagnostic unit 500 determines an estimated q-axis current value estimated as diagnostic q-axis current measurement Iqa used when current measuring unit 300 is normal, based on q-axis voltage command value (diagnostic q-axis voltage command value) |Vq|, which is converted into an absolute value. Specifically, abnormality diagnostic unit 500 calculates an estimated upper q-axis current limit, which is an upper limit of the estimated q-axis current value, and an estimated lower q-axis current limit, which is a lower limit of the estimated q-axis current value, considering variations in q-axis current measurement Iq due to various factors. The estimated upper q-axis current limit is calculated by an estimated upper limit calculating process 504. The estimated lower q-axis current limit is calculated by an estimated lower limit calculating process 505. The estimated upper q-axis current limit and the estimated lower q-axis current limit are thresholds that define a normal range of diagnostic q-axis current measurement Iqa. The estimated upper q-axis current limit and the estimated lower q-axis current limit gradually increase as diagnostic q-axis voltage command value |Vq| increases, as schematically illustrated in FIG. 6. Furthermore, as illustrated in FIG. 6, the normal range of diagnostic q-axis current measurement Iqa gradually widens as diagnostic q-axis voltage command value |Vq| increases.

Then, abnormality diagnostic unit 500 performs an abnormality determining process 506 based on diagnostic q-axis current measurement Iqa obtained in multiplying process 502, the estimated upper q-axis current limit obtained in estimated upper limit calculating process 504, and the estimated lower q-axis current limit obtained in estimated lower limit calculating process 505. Abnormality determining process 506 is a process for determining whether current measuring unit 300 is abnormal.

Figure 7A:
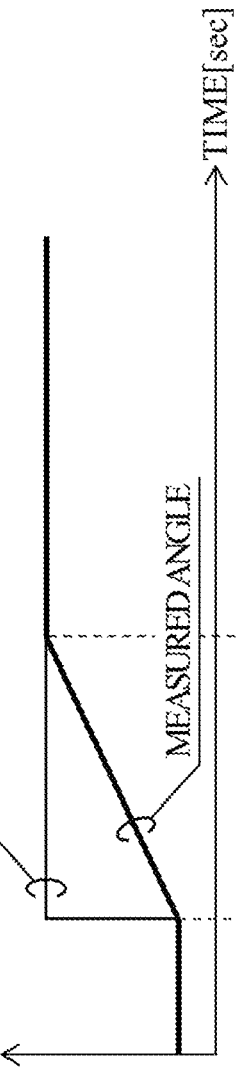
FIGS. 7A and 7B are timing diagrams illustrating the outline of the abnormality diagnostic processing in the abnormality diagnostic unit.
Figure 7B:
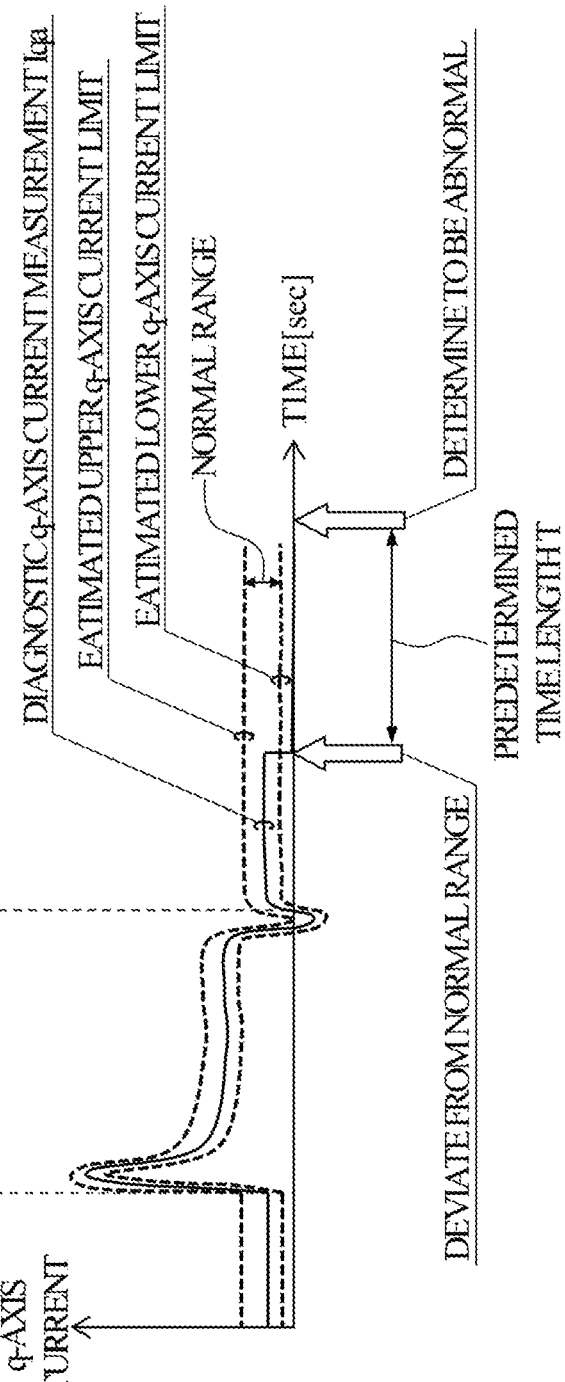

FIGS. 7A and 7B illustrate an example of a change in diagnostic q-axis current measurement Iqa with respect to a change in the rotational angle of control shaft 22. Basically, in abnormality determining process 506, abnormality diagnostic unit 500 determines that current measuring unit 300 is abnormal when an abnormal state in which diagnostic q-axis current measurement Iqa deviates from the estimated q-axis current value continues for predetermined time length T. More specifically, abnormality diagnostic unit 500 determines that current measuring unit 300 is abnormal when duration at which diagnostic q-axis current measurement Iqa continuously deviates from the normal range defined between the estimated upper q-axis current limit and the estimated lower q-axis current limit (duration of deviation) reaches predetermined time length T. When electric motor M is rotated so that the measured angle of control shaft 22 approaches the target angle, abnormality determining process 506 of abnormality diagnostic unit 500 can be performed in a state in which electric motor M is almost stopped, since q-axis current measurement Iq and its normal range are difficult to stabilize.

Here, an abnormality in which the current measurement voltage output from measuring circuit 302 of current measuring unit 300 becomes lower than a voltage corresponding to an actual DC bus current due to, for example, a decrease in resistance of shunt resistor 301 for some reason, is assumed. When such an abnormality (hereinafter, referred to as "current measurement gain decreasing abnormality") occurs, q-axis current measurement Iq also becomes a value closer to zero than the actual. This makes vector control unit 407 increase q-axis voltage command value Vq in order to have q-axis current measurement Iq approach q-axis current command value Iq*. However, since the torque of electric motor M becomes excessive and the rotational angle of control shaft 22 exceeds the target angle, ECU 30 calculates the target torque of electric motor M so that electric motor M generates a torque in the reverse direction. Then, vector control unit 407 calculates q-axis voltage command value Vq in order to have q-axis current measurement Iq approach q-axis current command value Iq* calculated because ECU 30 reverses the direction of the target torque. However, since q-axis current measurement Iq is a value closer to zero than the actual as described above, the torque in the reverse direction of electric motor M also becomes excessive, and the rotational angle of control shaft 22 exceeds the target angle on the other side.

Thus, it is assumed that when the current measurement gain decreasing abnormality occurs, the rotational angle of control shaft 22 vibrates without converging to the target angle, as illustrated in FIG. 8A, and electric motor M repetitively rotates forward and in reverse, as illustrated in FIG. 8B. In this state, as q-axis voltage command value Vq varies as illustrated in FIG. 8C, the estimated lower q-axis current limit repetitively moves upward and downward, as illustrated in FIG. 8D (the same applies to the estimated upper q-axis current limit. The description thereof will be omitted).

However, actual q-axis voltage command value Vq approaches zero due to effects of the induced voltage which increases as the rotational speed of electric motor M increases (this is different from FIG. 8C). Thus, as the rotational speed of electric motor M increases, the estimated lower q-axis current limit calculated based on diagnostic q-axis voltage command value |Vq| also decreases as illustrated in FIG. 8D. Thus, diagnostic q-axis current measurement Iqa falls below the estimated lower q-axis current limit and falls within the abnormal range when the rotational speed of electric motor M is relatively low; however diagnostic q-axis current measurement Iqa might exceed the lower q-axis current limit and might be within the normal range when the rotational speed of electric motor M is relatively high. Thus, as illustrated in FIG. 8E, there may be a case in which diagnostic q-axis current measurement Iqa falls within the normal state before the count value of an NG counter reaches predetermined time length T, the NG counter indicating duration of the abnormal state after diagnostic q-axis current measurement Iqa falls within the abnormal range. In this case, since the count value of the NG counter stored in a rewritable memory, such as a RAM, is reset to zero, there is a possibility of erroneous diagnosis, that is, the abnormality of current measuring unit 300 cannot be determined.

Thus, as illustrated in FIG. 9A, abnormality diagnostic unit 500 sets a time period in which the rotational speed of electric motor M is within predetermined range R that is a relatively low speed range including zero, as a diagnosis execution period for determining an abnormality. Predetermined range R is set in advance such that diagnostic q-axis current measurement Iqa falls below the estimated lower q-axis current limit and diagnostic q-axis current measurement Iqa becomes abnormal, when the current measurement gain decreasing abnormality occurs, as illustrated in FIG. 9B. Abnormality diagnostic unit 500 uses angular velocity ω of rotor MR obtained by rotor angular velocity calculating unit 403 to determine the start time and the end time of the diagnosis execution period based on whether the rotational speed of electric motor M is within predetermined range R.

Furthermore, when diagnostic q-axis current measurement Iqa continuously deviates from the normal range in the diagnosis execution period, abnormality diagnostic unit 500 increases the count value of the NG counter stored in the RAM or the like by the amount corresponding to the duration of continuous deviation (duration of deviation), as illustrated in FIG. 9C. After the diagnosis execution period, abnormality diagnostic unit 500 maintains the value of the NG counter without resetting it.

As illustrated in FIG. 9C, abnormality diagnostic unit 500 determines that current measuring unit 300 is abnormal, when the count value of the NG counter reaches predetermined time length T by integrating the duration of deviation. Then, as illustrated in FIG. 9D, abnormality diagnostic unit 500 sets an NG flag for indicating the rationality of current measuring unit 300 including shunt resistor 301, to indicate that an abnormality has occurred.

Figure 10:
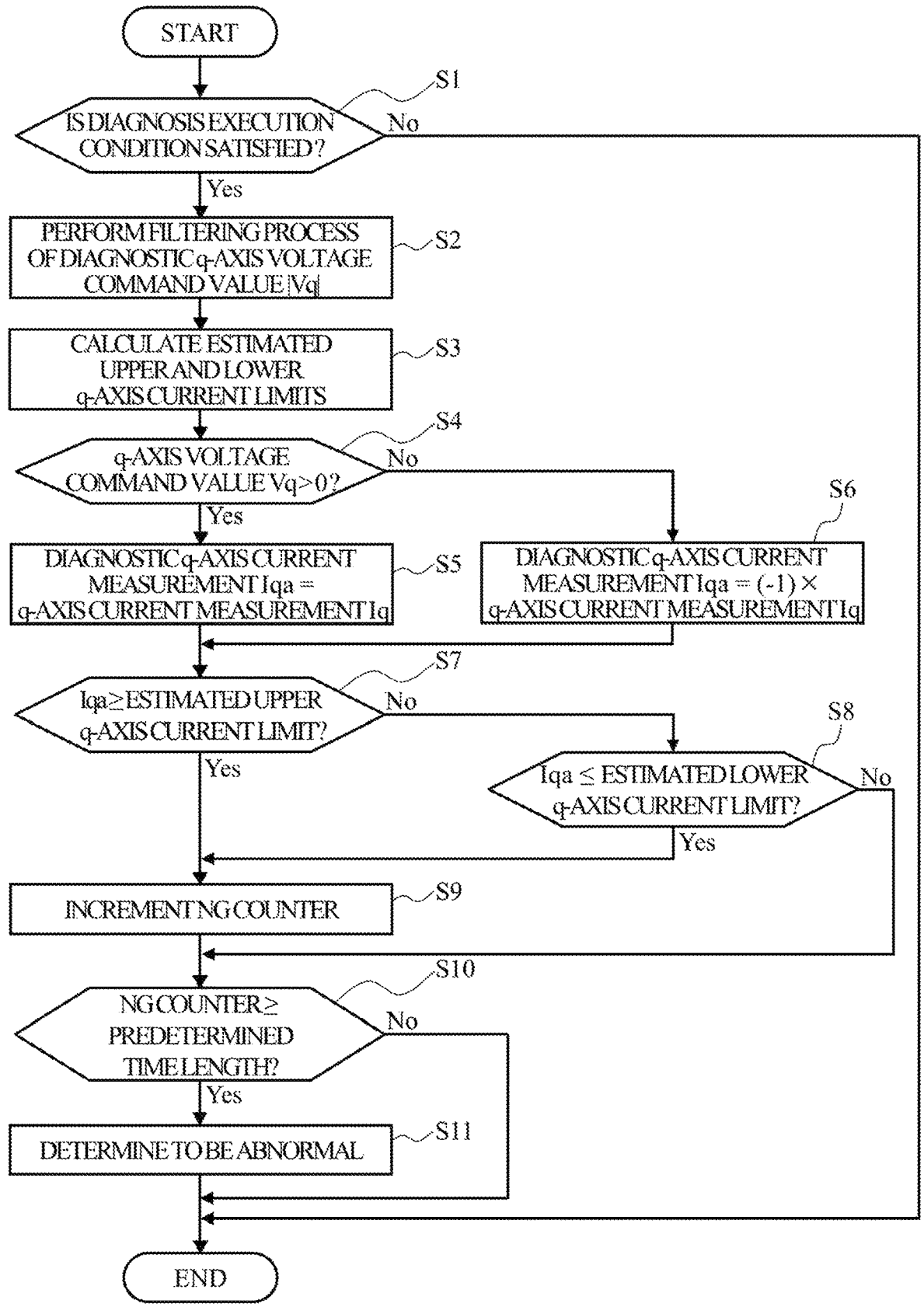
FIG. 10 is a flowchart illustrating an example of the abnormality diagnostic processing in the abnormality diagnostic unit.

FIG. 10 illustrates the abnormality diagnostic processing that is repetitively executed in abnormality diagnostic unit 500 when the ignition switch of the vehicle is turned on and power begins to be supplied to motor drive device 100.

In step S1 (abbreviated as "S1" in the figure. The same applies hereinafter.), abnormality diagnostic unit 500 determines whether a diagnosis execution condition is satisfied. The diagnosis execution condition is satisfied when all the following three conditions are satisfied. A first condition is satisfied when a drive permission condition, such as a condition in which a drive command signal of electric motor M is output from ECU 30 to controller 100, is satisfied. A second condition is satisfied when a failsafe relay that shuts off the power supply from an in-vehicle power supply E to inverter 200 at the time of abnormality, is not during a shutdown operation. A third condition is satisfied when the rotational speed of electric motor M is within the above-mentioned predetermined range R. Whether the rotational speed of electric motor M is within predetermined range R can be determined based on angular velocity ω of rotor MR obtained by rotor angular velocity calculating unit 403. Then, if abnormality diagnostic unit 500 determines that the diagnosis execution condition is satisfied (YES), the process proceeds to step S2, whereas if abnormality diagnostic unit 500 determines that the diagnosis execution condition is not satisfied (NO), the abnormality diagnostic processing is terminated.

In step S2, abnormality diagnostic unit 500 performs a filtering process on diagnostic q-axis voltage command value |Vq|. This filtering process is performed taking into consideration that, when the PWM pulse based on q-axis voltage command value Vq is output to inverter 200 to drive electric motor M, a time delay may occur until q-axis current measurement Iq reaches a value corresponding to q-axis voltage command value Vq. The time delay is a current response delay (first-order delay) due to motor characteristics (for example, inductance) of electric motor M. Thus, abnormality diagnostic unit 500 subjects diagnostic q-axis voltage command value |Vq| to the filtering process, so as to calculate the estimated upper q-axis current limit and the estimated lower q-axis current limit, considering the current response delay.

In step S3, abnormality diagnostic unit 500 calculates the estimated upper q-axis current limit and the estimated lower q-axis current limit based on diagnostic q-axis voltage command value |Vq|, which has been subjected to the filtering process in step S2. The normal range of diagnostic q-axis current measurement Iqa changes according to variations in at least one of multiple causes of variations of diagnostic q-axis current measurement Iqa. The causes of variations of diagnostic q-axis current measurement Iqa include the following. For example, voltage measurement by A/D conversion of current measurement voltage, current measurement by current measuring unit 300, and motor characteristics (induced voltage constant, q-axis resistance) of electric motor M, can be included. In addition, a margin of voltage drop due to dead time at the time of complementary type switching, rotor angle measurement, and oil temperature or exhaust performance of internal combustion engine 10, can be included.

For example, abnormality diagnostic unit 500 calculates the estimated upper q-axis current limit and the estimated lower q-axis current limit as follows, based on diagnostic q-axis voltage command value |Vq| subjected to the filtering process in step S2. When the estimated upper q-axis current limit is calculated considering the maximum value of the voltage measurement variation, the estimated lower q-axis current limit is calculated considering the minimum value of the voltage measurement variation. When the estimated upper q-axis current limit is calculated considering the maximum value of the current measurement variation, the estimated lower q-axis current limit is calculated considering the minimum value of the current measurement variation. When the estimated upper q-axis current limit is calculated considering the minimum value of the variation in the induced voltage constant, the estimated lower q-axis current limit is calculated considering the maximum value of the variation in the induced voltage constant. When the estimated upper q-axis current limit is calculated considering the minimum value of the variation in q-axis resistance, the estimated lower q-axis current limit is calculated considering the maximum value of the variation in q-axis resistance. When the estimated upper q-axis current limit is calculated considering the minimum value of the variation in voltage drop margin due to the dead time, q-axis current lower limit estimate value is calculated considering the maximum value of the variation in voltage drop margin due to the dead time. When the estimated upper q-axis current limit is calculated considering the maximum value of the rotor angle measurement variation, the estimated lower q-axis current limit is calculated considering the minimum value of the rotor angle measurement variation.

In step S4, abnormality diagnostic unit 500 determines whether q-axis voltage command value Vq is greater than zero. Then, if abnormality diagnostic unit 500 determines that q-axis voltage command value Vq is greater than zero (YES), the process proceeds to step S5, whereas if abnormality diagnostic unit 500 determines that q-axis voltage command value Vq is less than or equal to zero (NO), the process proceeds to step S6.

In step S5, abnormality diagnostic unit 500 decides q-axis current measurement Iq obtained by the three-phase-to-two-axis converting unit 404, as diagnostic q-axis current measurement Iqa for the abnormality diagnostic processing. On the other hand, in step S6, abnormality diagnostic unit 500 decides a value obtained by multiplying (−1) and q-axis current measurement Iq obtained by three-phase-to-two-axis converting unit 404, as diagnostic q-axis current measurement Iqa.

In step S7, abnormality diagnostic unit 500 determines whether diagnostic q-axis current measurement Iqa is greater than or equal to the estimated upper q-axis current limit. Then, if abnormality diagnostic unit 500 determines that diagnostic q-axis current measurement Iqa is greater than or equal to the estimated upper q-axis current limit (YES), diagnostic q-axis current measurement Iqa deviates from the normal range and falls within the abnormal range, and the process proceeds to step S9. On the other hand, if abnormality diagnostic unit 500 determines that diagnostic q-axis current measurement Iqa is less than the estimated upper q-axis current limit (NO), the process proceeds to step S8.

In step S8, abnormality diagnostic unit 500 determines whether diagnostic q-axis current measurement Iqa is less than or equal to the estimated lower q-axis current limit. Then, if abnormality diagnostic unit 500 determines that diagnostic q-axis current measurement Iqa is less than or equal to the estimated lower q-axis current limit (YES), diagnostic q-axis current measurement Iqa deviates from the normal range and falls within the abnormal range, and the process proceeds to step S9. On the other hand, if abnormality diagnostic unit 500 determines that diagnostic q-axis current measurement Iqa is greater than the estimated lower q-axis current limit (NO), diagnostic q-axis current measurement Iqa is within the normal range. Thus, step S9 is omitted, and the process proceeds to step S10.

In step S9, abnormality diagnostic unit 500 measures duration at which diagnostic q-axis current measurement Iqa is in the abnormal state, and increments (increases) the NG counter using the obtained duration. The duration at which diagnostic q-axis current measurement Iqa is in the abnormal state can be measured as duration at which the rotational speed of electric motor M is in a relatively low predetermined range R including zero.

In step S10, abnormality diagnostic unit 500 determines whether the count value of the NG counter is greater than or equal to predetermined time length T. Then, if abnormality diagnostic unit 500 determines that the count value of the NG counter is greater than or equal to predetermined time length T (YES), the process proceeds to step S11, in which it is determined that current measuring unit 300 is abnormal, and the NG flag is changed to a value indicating that an abnormality has occurred. On the other hand, if abnormality diagnostic unit 500 determines that the count value of the NG counter is less than predetermined time length T (NO), step S11 is omitted and the abnormality diagnostic processing is terminated.

It is assumed that if hunting occurs in rotational speed N of electric motor M due to the current measurement gain decreasing abnormality, as illustrated in FIG. 11A, rotational angle θ of control shaft 22 may fluctuate as illustrated in FIG. 11B. In this case, the predetermined time length of step S10 can be set as follows, so that an abnormality of current measuring unit 300 can be determined within a time period in which VCR mechanism 20 or internal combustion engine 10 is less affected.

First, assuming that rotational speed N of electric motor M continues with a hunting waveform of FIG. 11A, abnormality diagnostic unit 500 determines, from the hunting waveform, fluctuation period TA of rotational speed N and maximum fluctuation amount $N_p$ (peak value) of rotational speed N. Then, based on fluctuation period TA of rotational speed N and maximum fluctuation amount $N_p$ of rotational speed N, abnormality diagnostic unit 500 calculates duration at which rotational speed N of electric motor M is within predetermined range R (N1 to N2), that is, diagnosis execution time length TB. For example, when the hunting waveform of rotational speed N of electric motor M is approximated by a sine wave having an initial phase of α, times $t_i$ and $t_{ii}$ are calculated from the following two relational expressions (1) and (2). Thus, diagnosis execution time length TB ($=t_{ii}-t_i$) is calculated based on times $t_i$ and $t_{ii}$.

$$N1 = N_p \times \mathrm{SIN}\{(2\pi/TA) \times t_i + \alpha\} \qquad (1)$$

$$N2 = N_p \times \mathrm{SIN}\{(2\pi/TA) \times t_{ii} + \alpha\} \qquad (2)$$

Furthermore, assuming that rotational angle θ of control shaft 22 continues with a hunting waveform of FIG. 11B, abnormality diagnostic unit 500 determines maximum fluctuation amount $L_{p\text{-}p}$ (peak-to-trough value) of rotational angle θ in the hunting waveform. Then, based on determined maximum fluctuation amount $L_{p\text{-}p}$ of rotational angle θ and fluctuation period TA, abnormality diagnostic unit 500 calculates longest value (abnormality continuation permissible time length) TC of a time period in which VCR mechanism 20 or internal combustion engine 10 are hardly affected even if the abnormal state continues. For example, when rotational angle θ of control shaft 22 fluctuates by one period, the fluctuation amount is a fluctuation amount ($2 \times L_{p\text{-}p}$)

corresponding to a rotational angle which is twice maximum fluctuation amount $L_{p-p}$ of rotational angle θ. On the other hand, assuming that Lmax is set in advance as a limit of fluctuation amount in which hunting of the rotational speed of electric motor M hardly affects VCR mechanism 20 or internal combustion engine 10, abnormality continuation permissible time length TC is calculated by the following relational expression (3).

$$TC = (Lmax/(2 \times L_{p-p})) \times TA \quad (3)$$

Then, abnormality diagnostic unit 500 calculates predetermined time length T based on period TA of the hunting waveform, diagnosis execution time length TB, and abnormality continuation permissible time length TC, which are calculated as described above. For example, assuming that the number of periods until the count value of the NG counter reaches predetermined time length T is P, the following two relational expressions (4) and (5) hold. Here, it is assumed that diagnosis execution time length TB is equal to the duration of deviation at which diagnostic q-axis current measurement Iqa continuously deviates from the normal range.

$$T = 2 \times TB \times P \quad (4)$$

$$TC \geq TA \times P \quad (5)$$

Thus, if P is deleted from the above two relational expressions (4) and (5), the following relational expression (6) is obtained.

$$T \leq (2 \times TB \times TC)/TA \quad (6)$$

When attaching importance to the accuracy of abnormality determination, longer predetermined time length T may be preferable. Thus, from the relational expression (6), predetermined time length T is defined by the following relational expression (7). This makes it possible to determine the abnormality at relatively high accuracy while suppressing a secondary failure of VCR mechanism 20 or internal combustion engine 10 due to the current measurement gain decreasing abnormality.

$$T = (2 \times TB \times TC)/TA \quad (7)$$

According to such a motor drive device 100, controller 400 determines whether an abnormality occurs in current measuring unit 300 including one shunt resistor 301 as follows. That is, abnormality diagnostic unit 500 determines whether current measuring unit 300 is abnormal based on duration at which diagnostic q-axis current measurement Iqa calculated from q-axis current measurement Iq deviates from the normal range of estimated q-axis current value set based on diagnostic q-axis voltage command value |Vq|. Thus, motor drive device 100 does not use any additional current measuring unit, in addition to current measuring unit 300, when determining whether current measuring unit 300 is abnormal. Thus, according to motor drive device 100, it is possible to determine whether current measuring unit 300 is abnormal with a simple configuration, without increasing the number of components.

Furthermore, it is assumed that when hunting occurs in the rotational speed of electric motor M due to the current measurement gain decreasing abnormality, an actual q-axis voltage command value, and ultimately, the estimated lower q-axis current limit approach zero due to effects of the increased induced voltage that increases as the rotational speed of electric motor M increases. In such a case, although there may be a case in which diagnostic q-axis current measurement Iqa exceeds the estimated lower q-axis current limit and falls within the normal range, it is possible to determine whether current measuring unit 300 is abnormal, by motor drive device 100 in the following manner. That is, abnormality diagnostic unit 500 sets a time period in which the rotational speed of electric motor M is within predetermined range R that is a relatively low speed range including zero, as the diagnosis execution period. Thus, it is possible for abnormality diagnostic unit 500 to determine whether diagnostic q-axis current measurement Iqa is within the normal range with reduced effects of induced voltage on the estimated lower q-axis current limit. Then, even if each diagnosis execution time length has not reached predetermined time length T, abnormality diagnostic unit 500 maintains the value of the NG counter incremented by each diagnosis execution time length, without resetting it. Thus, it is possible for abnormality diagnostic unit 500 to determine that current measuring unit 300 is abnormal when the count value of the NG counter reaches predetermined time length T.

In the foregoing embodiment, d-axis current command value setting unit 405 sets d-axis current command value Id* to zero ("Id=zero control"). Alternatively, d-axis current command value setting unit 405 may set d-axis current command value Id* to a value other than zero by adopting the vector control method depending on the type of electric motor M. For example, when electric motor M is an interior permanent magnet (IPM) synchronous motor with an embedded magnet structure in which permanent magnets are embedded in rotor MR, a vector control method other than "Id=zero control" may be adopted.

When adopting a vector control method other than "Id=zero control", abnormality diagnostic unit 500 may determine whether current measuring unit 300 is abnormal based on d-axis current command value Vd and d-axis current measurement Id, similarly to the above embodiment. That is, abnormality diagnostic unit 500 calculates an estimated upper d-axis current limit and an estimated lower d-axis current limit based on diagnostic d-axis voltage command value |Vd| obtained by subjecting d-axis voltage command value Vd to absolute value processing and filtering processing. Abnormality diagnostic unit 500 also calculates diagnostic d-axis current measurement Ida based on d-axis current measurement Id and sign information of d-axis voltage command value Vd. Then, abnormality diagnostic unit 500 determines that current measuring unit 300 is abnormal, when duration at which diagnostic d-axis current measurement Ida continuously deviates from the normal range defined between the estimated upper d-axis current limit and the estimated lower d-axis current limit reaches predetermined time length T.

However, when abnormality diagnostic unit 500 performs the abnormality diagnostic processing based on d-axis current command value Vd and d-axis current measurement Id, the estimated upper d-axis current limit and the estimated lower d-axis current limit are not affected by induced voltage, even if the rotational speed of electric motor M increases. This means that the diagnosis execution period may not be limited to a time period in which the rotational speed of electric motor M is within predetermined range R. Thus, abnormality diagnostic unit 500 can exclude the condition that the rotational speed of electric motor M is within abovementioned predetermined range R, from the diagnosis execution condition of step S1. Thus, it is possible for abnormality diagnostic unit 500 to perform the abnormality diagnostic processing without using information on angular velocity ω of rotor MR.

In the above embodiment, a case may be assumed in which, even if hunting of the rotational speed of electric motor M occurs due to the current measurement gain decreasing abnormality, diagnostic q-axis current measurement Iqa is not within the normal range due to the motor characteristics of electric motor M. In this case, the condition that the rotational speed of electric motor M is within predetermined range R may be excluded from the diagnosis execution condition of step S1.

In the abnormality diagnostic processing (see FIG. 10) of the above embodiment, abnormality diagnostic unit 500 merely omits the incrementing process of the NG counter of step S9 when it is determined in step S8 that diagnostic q-axis current measurement Iqa is within the normal range. Alternatively, abnormality diagnostic unit 500 may reset the NG counter or may decrement (decrease) the NG counter before the process of step S10, when it is determined in step S8 that diagnostic q-axis current measurement Iqa is within the normal range and it is in the normal state. This makes it easier for the count value of the NG counter to reach predetermined time length T when diagnostic q-axis current measurement Iqa continuously stays in the abnormal range, while making it difficult for the count value of the NG counter to reach predetermined time length T when diagnostic q-axis current measurement Iqa intermittently falls within the abnormal range. Thus, it is possible to reduce an erroneous diagnosis.

In the above embodiment, when abnormality diagnostic unit 500 determines that current measuring unit 300 is abnormal in step S11 and changes the NG flag to a value indicating the occurrence of abnormality, the following may be performed. That is, based on the value of the NG flag, controller 400 may shut down a fail-safe relay (not shown) inserted in the DC bus between in-vehicle power supply E and inverter 200, to stop supplying power to electric motor M. This makes it possible to prevent a secondary failure of VCR mechanism 20 or internal combustion engine 10. Furthermore, in addition to the above-described fail-safe relay shutdown, or alternatively, controller 400 may set the duty cycle of the PWM pulse output from controller 400 to switching elements 201 to 206 of inverter 200 to be zero. For example, in order to output the PWM pulse with the duty cycle of zero, vector control unit 407 may perform a forced process, such as a process for setting d-axis voltage command value Vd and q-axis voltage command value Vq to be zero.

The present invention is described in detail above, referring to the preferred embodiments, but it is obvious that one skilled in the art can make various modifications based on the basic technical idea and teachings. For example, although motor drive device 100 is applied to drive electric motor M serving as the power source of compression ratio control actuator 23 in VCR mechanism 20, the invention is not limited thereto. Motor drive device 100 may be applicable to an electric motor serving as an in-vehicle actuator for driving an in-vehicle system. For example, a valve timing control (VTC) that controls the rotational phase of the cam in internal combustion engine 10 to be variable, a variable valve event and lift control (VEL) that controls the operating angle and lift amount of intake valve 14A and exhaust valve 14B to be variable, an electric brake system, an electric power steering, and the like. In short, motor drive device 100 may be a device that performs a current feedback control, so that a current measurement reaches a target current value calculated based on a deviation between the operating position and the target position of an in-vehicle system, which is driven by an electric motor serving as an in-vehicle actuator.

Although magnetic pole position sensor PS has been described as an example of the magnetic pole position measuring means for measuring the magnetic pole position of rotor MR in electric motor M, the magnetic pole position may be measured by a known sensorless technique that does not use magnetic pole position sensor PS.

Motor drive device 100 is not limited to being incorporated in compression ratio control actuator 23. Motor drive device 100 may be separately formed from compression ratio control actuator 23. Motor drive device 100 may be constituted such that Inverter 200 and controller 400 are separately formed.

REFERENCE SYMBOL LIST

10 Internal combustion engine
20 VCR mechanism
22 Control shaft
23 Compression ratio control actuator
100 Motor drive device
200 Inverter
300 Current measuring unit
301 Shunt resistor
302 Measuring circuit
400 Controller
401 Phase current measuring unit
402 Rotor angle calculating unit
403 Rotor angular velocity calculating unit
404 Three-phase-to-two-axis converting unit
407 Vector control unit
500 Abnormality diagnostic unit
501 Sign information extracting process
502 Multiplying process
503 Absolute value process
504 Estimated upper limit calculating process
505 Estimated lower limit calculating process
506 Abnormality determining process
M Electric motor
Iq q-Axis current measurement
Iqa Diagnostic q-axis current measurement
Vq q-Axis voltage command value
|Vq| Diagnostic q-axis voltage command value
R Predetermined range
T Predetermined time length
TA Fluctuation period of rotational speed of electric motor
$N_p$ Maximum fluctuation amount of rotational speed of electric motor
$L_{p\text{-}p}$ Maximum fluctuation amount of rotational angle of control shaft
PS Magnetic pole position sensor

The invention claimed is:

1. A motor drive device comprising: an inverter configured to supply an alternating-current power to an electric motor; a current sensor configured to measure a direct-current bus current of the inverter; and a controller configured to control the inverter based on an output of the current sensor, wherein the controller is configured to integrate a duration of deviation each time a q-axis current measurement continuously deviates from an estimated q-axis current value, and determine that the current sensor is abnormal when the integrated duration of deviation, which is an integrated value of the duration of deviation, reaches a predetermined time length.

2. The motor drive device according to claim 1, wherein, when the rotational speed of the electric motor is fluctuating, the predetermined time length is set based on a fluctuation period of the rotational speed, a fluctuation amount of the rotational speed, and a fluctuation amount of an object to be driven by the electric motor.

3. The motor drive device according to claim 1, wherein the controller is configured to compare the q-axis current measurement and the estimated q-axis current value, when a rotational speed of the electric motor is within a predetermined range including zero.

4. The motor drive device according to claim 1, wherein the estimated q-axis current value is estimated considering a current response delay due to a motor characteristic of the electric motor in responding to application of a q-axis voltage command value.

5. The motor drive device according to claim 1, wherein: the estimated q-axis current value is estimated based on a diagnostic q-axis voltage command value obtained by converting a q-axis voltage command value into an absolute value, and the q-axis current measurement is a diagnostic q-axis current measurement, a sign of which is determined based on whether the q-axis voltage command value is a positive number or a negative number.

6. A control method for a motor drive device including: an inverter that supplies an alternating-current power to an electric motor; and a current sensor that measures a direct-current bus current of the inverter, the method comprising: comparing a q-axis current measurement calculated based on an output of the current sensor and an estimated q-axis current value estimated based on a q-axis voltage command value; integrating a duration of deviation each time the q-axis current measurement continuously deviates from the estimated q-axis current value; and determining that the current sensor is abnormal when the integrated duration of deviation, which is an integrated value of the duration of deviation, reaches a predetermined time length.

* * * * *